US009065683B2

(12) United States Patent
Wolosewicz et al.

(10) Patent No.: US 9,065,683 B2
(45) Date of Patent: Jun. 23, 2015

(54) CONTENT INTERACTIVITY GATEWAY (75) Inventors: Jack Wolosewicz, San Francisco, CA (US); Erich Breisacher, San Francisco, CA (US)

(73) Assignee: MediaClaw, Inc., San Francisco, CA (US)

( * ) Notice: Subject to any disclaimer, the term of this patent is extended or adjusted under 35 U.S.C. 154(b) by 1894 days.

(21) Appl. No.: 11/548,039

(22) Filed: Oct. 10, 2006

(65) Prior Publication Data
US 2007/0174624 A1 Jul. 26, 2007

Related U.S. Application Data (60) Provisional application No. 60/739,812, filed on Nov. 23, 2005, provisional application No. 60/776,128, filed on Feb. 23, 2006.

(51) Int. Cl.
| | | |
|---|---|---|
| G06Q 30/02 | (2012.01) | |
| H04L 12/66 | (2006.01) | |
| G06F 21/10 | (2013.01) | |
| H04L 29/06 | (2006.01) | |
| H04N 21/254 | (2011.01) | |
| H04N 21/2547 | (2011.01) | |
| H04N 21/422 | (2011.01) | |
| H04N 21/426 | (2011.01) | |
| H04N 21/433 | (2011.01) | |
| H04N 21/439 | (2011.01) | |
| H04N 21/442 | (2011.01) | |

(Continued)

(52) U.S. Cl.
CPC .............. *H04L 12/66* (2013.01); *G06F 21/10* (2013.01); *H04L 63/10* (2013.01); *H04N 21/2541* (2013.01); *H04N 21/2547* (2013.01); *H04N 21/42203* (2013.01); *H04N 21/42684* (2013.01); *H04N 21/4331* (2013.01); *H04N 21/4333* (2013.01); *H04N 21/4394* (2013.01); *H04N 21/44236* (2013.01); *H04N 21/45455* (2013.01); *H04N 21/458* (2013.01); *H04N 21/4788* (2013.01); *H04N 21/6543* (2013.01); *H04N 21/6581* (2013.01); *H04N 21/812* (2013.01); *H04N 21/8358* (2013.01); *H04N 21/8586* (2013.01)

(58) Field of Classification Search
CPC .................................................. G06Q 30/0241
USPC .................................................... 705/14.4
See application file for complete search history.

(56) References Cited

U.S. PATENT DOCUMENTS

| | | | | |
|---|---|---|---|---|
| 6,122,403 A | * | 9/2000 | Rhoads | .......................... 382/233 |
| 6,134,532 A | | 10/2000 | Lazarus et al. | |

(Continued)

OTHER PUBLICATIONS

International Search Report corresponding to International Application No. PCT/US07/80823, dated Sep. 9, 2008, 2 pages.

*Primary Examiner* — Jamie Kucab
(74) *Attorney, Agent, or Firm* — Soody Tronson; STLG Law Firm (57) ABSTRACT

A gateway (e.g., a web site) connects content (e.g., pirated content) playing on a host device to a variety of informational, advertising, merchandising and DRM resources. Links, icons and other elements for connecting with the resources are provided to the host device by the gateway and can be presented to the user while the content is playing or paused. The type of resource presented to the user and the timing of the presentation can be based on content identifying information, timing information and/or other information provided by the host device.

13 Claims, 8 Drawing Sheets

(51) Int. Cl.
*H04N 21/4545* (2011.01)
*H04N 21/458* (2011.01)
*H04N 21/4788* (2011.01)
*H04N 21/6543* (2011.01)
*H04N 21/658* (2011.01)
*H04N 21/81* (2011.01)
*H04N 21/8358* (2011.01)
*H04N 21/858* (2011.01)

(56) References Cited

U.S. PATENT DOCUMENTS

| | | | |
|---|---|---|---|
| 6,650,761 B1 * | 11/2003 | Rodriguez et al. | 382/100 |
| 6,847,969 B1 | 1/2005 | Mathai et al. | |
| 6,850,252 B1 | 2/2005 | Hoffberg | |
| 7,024,018 B2 * | 4/2006 | Petrovic | 382/100 |
| 7,146,501 B2 * | 12/2006 | Tanaka | 713/176 |
| 2006/0294571 A1 | 12/2006 | Moore et al. | |

* cited by examiner

CONTENT INTERACTIVITY GATEWAY

RELATED APPLICATIONS

This application claims the benefit of priority from U.S. Provisional Patent Application No. 60/739,812, for "Content Protection Through The Use of Watermarking," filed Nov. 23, 2005 and U.S. Provisional Patent Application No. 60/776,128, for "Video and Audio Content Broadcast Interactivity Through The Use of Audio Watermarking," filed Feb. 23, 2006. Each of these provisional patent applications is incorporated by reference herein in its entirety.

TECHNICAL FIELD

The subject matter of this application is generally related to watermarking, online advertising and digital rights management (DRM).

BACKGROUND

Content (e.g., videos, audio, photos, etc.) is consumed, moved around on the Internet and/or traded over networks (e.g., peer-to-peer networks) in ever increasing volume. Currently, the primary methods for monetizing content on the Internet are to charge on a per download basis or to sell subscriptions to download services which can charge a monthly fee to end users for a certain number of items downloaded per month. As the volume of content increases, it can be difficult to control the distribution of content (e.g., pirated content), so that it can be properly monetized.

Digital content can be distributed over the Internet without regard to a target broadcast market. Indeed, many content providers have identified Internet locality monetization issues as a major concern with Internet broadcast scenarios. Content providers have argued that different charges should apply to broadcasts in more lucrative markets and that some markets should be blocked from receiving broadcasts altogether. Additionally, content providers argue that interactive, content based advertising should be relevant to the geographic location of the user to ensure that advertisements are successfully targeted.

SUMMARY

A gateway (e.g., a web site) connects content (e.g., pirated content) playing on a host device to a variety of informational, advertising, merchandising and DRM resources. Links, icons and other elements for connecting with the resources are provided to the host device by the gateway and can be presented to the user while the content is playing or paused. The type of resource presented to the user and the timing of the presentation can be based on content identifying information, timing information and/or other information provided by the host device. The device can be connected to the gateway by a link or other communication mechanism included in a multi-protocol reader in the host device (e.g., a watermark reader) and/or embedded in the content.

The disclosed implementations of a content interactivity gateway provide a structure which enables content providers and advertisers to interact over a network (e.g., the Internet) and generate revenues regardless of the manner in which the content was distributed or acquired. It also creates an opportunity for hundreds of ads to be tied to content (e.g., video) while the content is presented. Ads can be periodically updated as the relevant products or information corresponding to the ads change. In this manner, content is not connected to outdated material and the same ad space can be resold continuously. A user would then have the option to view only the items of interest by clicking on an ad (e.g., icon, link), which can stop the content from playing and connect the host device to the ad. In some implementations, content can be consumed without interruption and only the action of pausing the consumption (e.g., pausing a video or film) exposes the ad links relevant to that content interval (e.g., pausing a film at a certain scene of interest in which items of interest may appear).

In some implementations, content interactivity information can be read by a multi-protocol reader resident on a host device. The multi-protocol reader can read a variety of information and protocols, including but not limited to: watermarks (audio or video), metadata, headers, XML and any form of content descriptor. The host device can be geo-location aware and block distribution in geographic regions in accordance with DRM rules specified by a content provider. This geo-location capability can also be used as an enabler for location based advertising, which can be tied to content.

Several types of online and offline advertising environments can be supported by the gateway. For online advertising, the gateway can provide relevant and fully interactive ads that can be presented with the content while the content is being played by a host device. For offline advertising, the gateway can upload static content (e.g., a cached web page, image) to a host device, so that ads can be presented on demand. Multiple cached ads can be assigned to the same link so ads can be rotated in case of multiple viewing of the same content. In some implementations, offline moving ads can be supported by uploading short clips in place of static images to the host device.

To thwart piracy, content distributed by the gateway (or by other means) can display moving or static ads on a strip or a subsection overlying content when displayed on a host device. The moving or static ads can be overwritten by the original content displaced by the ad, provided the user is online and has proper usage rights.

DETAILED DESCRIPTION

Content Interactivity System Overview

Figure 1A:
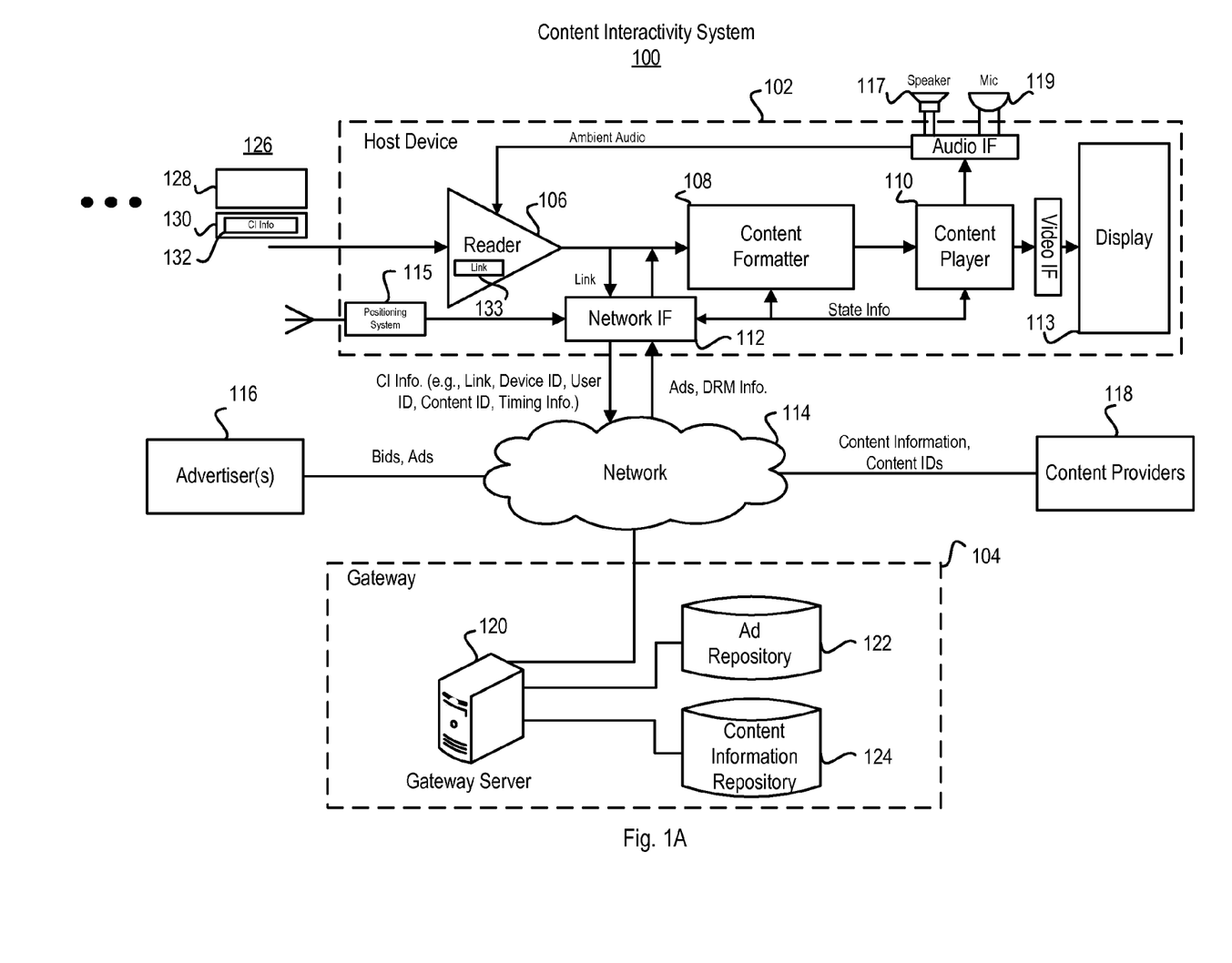
FIG. 1A is a block diagram of an exemplary content interactivity system.

FIG. 1A is a block diagram of a content interactivity system 100. In some implementations, the system 100 includes one or more host devices 102 coupled to a resource gateway 104 through a network 114. One or more advertisers 116 and content providers 118 can use the network 114 to communicate with the gateway 104.

The host device 102 can be any device capable of receiving content, including but not limited to: computers, web-enabled devices, mobile phones, media players, music players, game consoles, personal digital assistants (PDAs), televisions, etc. Host devices 102 can also be devices tethered to devices coupled to the network 114 (e.g., removable storage devices).

The host device 102 can receive content from a "controlled" distribution channel or an "uncontrolled" distribution channel. A "controlled" distribution channel is a channel where content is distributed under the control of the content owner or licensee. Such content is typically monetized and distributed in accordance with DRM rules or procedures. By contrast, an "uncontrolled" distribution channel is a channel where content is distributed outside the control of the content owner or licensee. Such content is typically not monetized or may have been "pirated". One example of an "uncontrolled" distribution channel is a peer-to-peer ("P2P") network, where users can retrieve copies of copyrighted content from other user's host devices. Another example, is the uncontrolled distribution of copyrighted content on a non-network medium (e.g., DVD, CD ROM, USB Drive, etc.).

The network 114 can be one or more communication channels configured in a variety of topographies. Some examples of a network 114 include but are not limited to: the Internet, an intranet, a peer-to-peer network, Ethernet, a Wide Area Network (WAN), Local Area Network (LAN), a wireless network, a cable television network, etc.

In some implementations, the gateway includes a server 120, an advertisement (ad) repository 122 and a content information repository 124. The ad repository 122 can store ads and other related information. Ads can include but are not limited to: banners, links, buttons, icons, frames, images, video, graphics, linked units, leader board, ticker tape, skyscrapers, referral buttons, themed units (e.g., related to holidays), audio snippets, etc. The content information repository 124 can include various content-related information, including DRM information (e.g., usage rights).

In the example shown, the repositories 122 and 124 are separate storage devices. In other implementations, the repositories 122 and 124 can be a single storage device, or multiple storage devices distributed over a network (e.g., a storage area network (SAN)). The gateway 104 can also include one or more servers 120 which are co-located in the same facility or distributed over a network.

In some implementations, the host device 102 includes a multi-protocol reader 106, a content formatter 108 and a content player 110. The reader 106 can be configured to extract content interactivity information (hereinafter also referred to as "CI information") from the content 126 that can be used to establish a connection with the gateway 104, and to facilitate interactivity with various resources by, or through, the gateway 104. Some CI information can be included in the multi-protocol reader 106, such as a link 133 (e.g., URI) to the gateway 104. The content 126 can be any material which is of interest to users, including but not limited to: video, audio, text information, graphics, ads, digital photos, digital rights information, music, movies, software, multimedia, documents, television or radio. broadcasts, web casts, web pages, etc.

In the example shown, the content 126 received by the host device 102 includes video content 128 and audio content 130. The audio content 130 and/or video content 128 can include CI information 132. The CI information 132 can include a link (e.g., Uniform Resource Identifier (URI)) and one or more identifiers. In some implementations, the CI information 132 can be retrieved from the payload of a digital watermark by the multi-protocol reader 106 (e.g., audio and/or video watermarks) and used to access various resources provided by, or through, the gateway 104. Generally, a digital watermark is information that can be imperceptibly and robustly embedded in the content 126, such that it cannot be removed. A digital watermark typically includes a payload that contains information about the origin, status, or recipient of the content 126. The payload can include other types of information, such as information describing the content 126 and links to resources. A watermark payload that is capable of carrying a URI for accessing a web site is described in U.S. Pat. No. 6,411,725, for "Watermark Enabled Video Objects," which patent is incorporated by reference herein in its entirety. Various types of known audio and video watermarking techniques are suitable for use with the content interactivity system 100. Some of these watermarking techniques are described in Jeng-Shyang Pan, Hsiang-Cheh Huang, L. C. Jain, "Intelligent Watermarking Techniques (Series on Innovative Intelligence—Vol. 7)," World Scientific Publishing Company (2004), which is incorporated by reference herein in its entirety.

In other implementations, the CI information can be metadata, such as standardized content descriptors or XML descriptors which can be read by the multi-protocol reader 106 and distributed to host devices 102 through various distribution channels, including over a network (e.g., the Internet, peer-to-peer, wireless) or through a storage media (e.g., a DVD, CD ROM, Flash drive).

In some implementations, the CI information 132 is persistent data (i.e., persists in the content 126) that is received with the content 126 at the host device 102. The CI information 132 can be combined with content 126 in different ways, including embedding the CI information 132 in the content 126 (e.g., in a digital watermark) or inserting the CI information 132 in the header or payload of a data packet or data stream. The CI information 132 need not be related to any specific resource (e.g., an advertiser website). Rather, resources can be matched to the content 126 by the gateway 104 based on information provided by advertisers 116 and content providers 118.

Using the gateway 104 to match content with resources provides advantages over conventional solutions that include dedicated links to predefined resources. With conventional solutions, the content providers 118 would have to manage a large number of dedicated links to individual resources, rather than a single "generic" link to the gateway 104. Using the gateway 104, the content providers 118 need only insert a single link in the content or the multi-protocol reader 106 (e.g., link 133) for connecting to the gateway 104 and a content identifier for identifying the content, and the gateway 104 handles the rest, by matching resources (e.g., ads, DRM information) with content based on the content identifier and other information collected from advertisers 116 and content providers 118 and/or the host device 102 (e.g., host device ID, user ID, location information).

Figure 3:
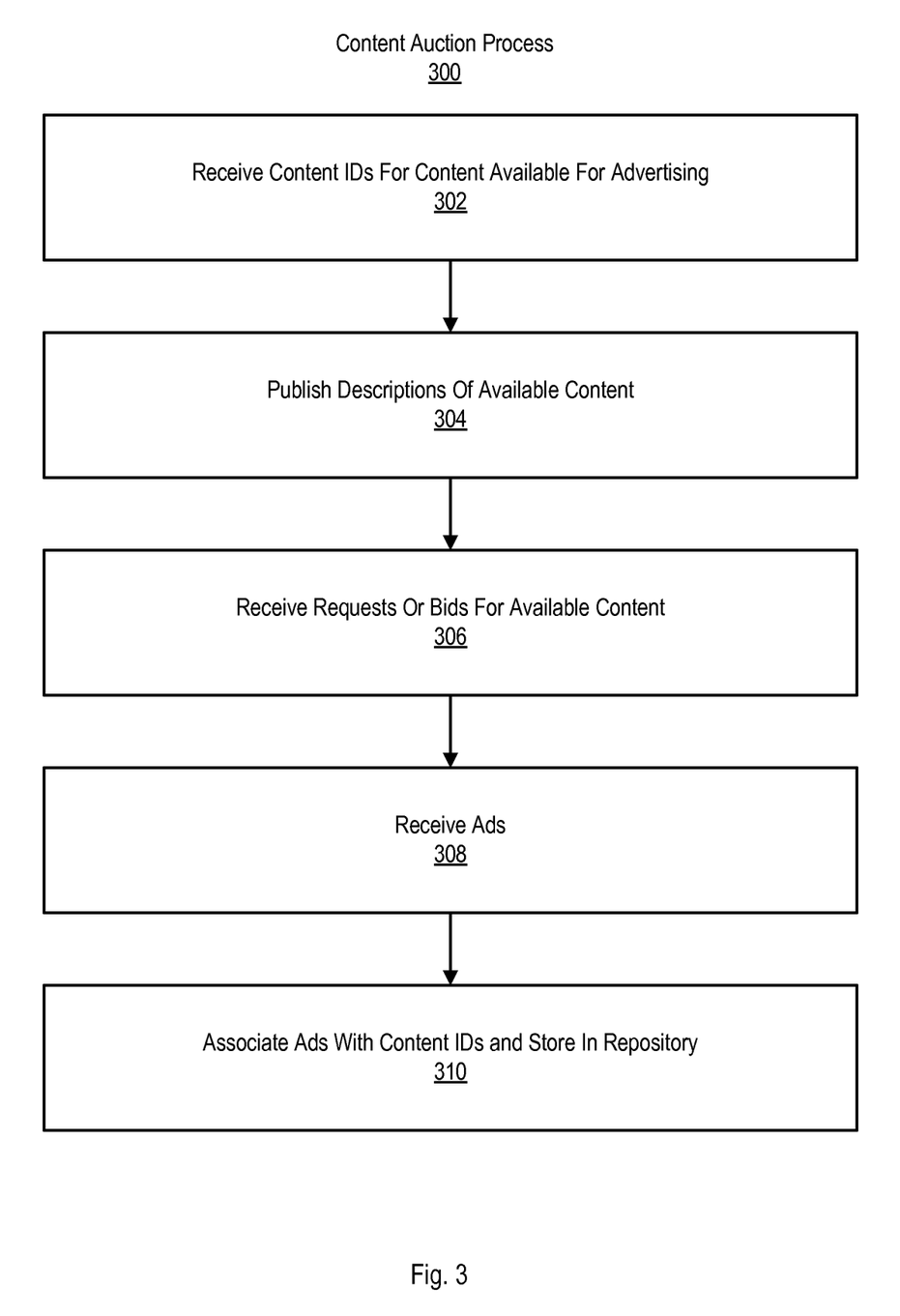
FIG. 3 is a flow diagram of an exemplary content auction process.

In some implementations, the CI information 132 is read by the multi-protocol reader 106 and transmitted to the gateway 104, where it is used to match the content 126 with one or more resources, such as ads from one or more advertisers who previously bid on ad space associated with the content 126, as described in reference to FIG. 3. In the addition to a link for connecting to the gateway 104, other CI information 132 can be received with the content 126, including but not limited to: a content identifier, a user identifier, a host device identifier, timing information for enabling the gateway 104 to determine the portion of content 126 that is currently playing on the host device 102, the geographic location of the host device 102, personalized information related to the user of the host device 102, etc.

In some implementations, all or a portion of the CI information 132 can be contained in digital watermarks, headers, and/or metadata, which are associated with the content 126. If digital watermarks are used to carry the CI information 132, then the reader 106 can be configured to read the watermarks and decode the CI information. The digital watermark can be fully or partially decoded by the reader 106. For example, the reader 106 can be a secure binary audio watermark reader, which implements standard audio codec technology (e.g., AAC, HE-AAC) to provide partially decoded content (e.g., filterbank outputs) to the gateway 104, which then performs or completes the watermark extraction, so that the CI information 132 can be retrieved. The reader 106 can also be a secure binary video or image watermark reader, which sends partially decoded content to the gateway 104 for decoding of the video or image watermark.

In other implementations, all or a portion of the CI information 132 can be stored locally in the host device 102 (e.g., Flash memory, hard disk) and/or an external storage device (e.g., network device, removable storage device) operatively coupled to the host device 102. When the gateway 104 is contacted, the gateway 104 can use the CI information 132 to access a variety of informational, advertising and merchandising resources provided by, or through, the gateway 104. Other preprocessing can also be performed by the reader 106.

In some implementations, the CI information 132 can be included in the content player 110. Examples of content players include but are not limited to software media players, such as Microsoft Inc.'s Windows® Media Player and RealNetworks, Inc.'s RealPlayer.

In some implementations, the content 126 received by the host device 102 is protected using one or more known techniques (e.g., scrambling, encryption, steganographic concealing of critical information), which requires reformatting (e.g., reconstruction) of the content 126 by the content formatter 108 using information contained in an audio, image or video watermark, as described in U.S. Provisional Patent Application No. 60/739,812, for "Content Protection Through The Use of Watermarking," which provisional application is incorporated by reference herein in its entirety. Once the content 126 is reconstructed, the content 126 can be output to audio and/or video interfaces for playing the content on the host device 102 using a display screen 113, speaker system 117 and/or headphones.

In some implementations, a one-time pad encryption key or "pad" can be inserted in a watermark to address key management issues. Each instance of content can be individually encrypted with its own key/pad. A look-up table (LUT) or mapping algorithm (pad) contained in the watermark can be used to map a standard Hex sequence to a one-time random Hex sequence. For example, the standard hex sequence 1, 2, 3, . . . , D, E, F, can be mapped to a one-time random Hex sequence 4, 8, F, . . . 0, 2, 5, A. Since the key or pad travels with the content there are no key management issues.

In some implementations, ambient audio transmitted by, for example, the speakers, can be received through an audio detection device (e.g., a microphone 119). The ambient audio can include CI information 132 that can be extracted and transmitted to the gateway 104, where it can be used to connect to the gateway 104 and provide access to a variety of information, advertising and merchandising resources.

CI information 132 can be added to content 126 by content owners or by third parties in a distribution chain (e.g., a broadcaster, clearing house). A link to the gateway 104 can be inserted in the payload of a digital watermark embedded in, or transmitted with, the content 126. Alternatively, the link to the gateway 104 can be included in the multi-protocol reader 106, which can be distributed to host devices 102, and automatically installed on the host devices 102 using standard operating system installation methods. For example, compressed code for the multi-protocol reader 106 containing a hard coded link to gateway 104 can be transmitted in the beginning of a content bit stream and automatically unpacked, uncompressed (if compressed) and installed while the content is being buffered in preparation for playback on the host device 102.

There are many possible manifestations of the multi-protocol reader 106 that can be distributed to host devices 102. For example, the reader can be distributed as part of: 1) independent executable software, 2) an operating system or operating system component (e.g., plug-in, dynamic link library), 3) DRM software or hardware, 4) encryption/decryption software or hardware, 5) compression/decompression software or hardware, and 6) digital signal processing (DSP) software or hardware. The reader can be inserted anywhere in audio and/or video processing paths in a host device 102, including during decryption, decompression or presentation processes.

In some implementations, state information can be generated by the content player 110 and sent to the gateway 104 through the network interface 112 and network 114. Examples of state information includes content player states, such as start, stop, pause, fast forward, reverse, slow motion, shuffle, etc. The gateway 104 can use the state information to determine how to deliver ads. For example, while the state of the content player 110 is in "fast forward," the gateway 104 may stop delivery of ads, since the user would not be able to interact with the ads in a meaningful way.

In some implementations, information can be generated by a positioning system 115 (e.g., GPS). For example, a GPS receiver can be included in the host device 102, which supplies location information to the gateway 104, which can be used to connect the user's location to appropriate informational, advertising and merchandising resources. Alternately geo-positioning services which keep databases of the geographic location of IP address can be used to supply location information to the gateway 104. Alternately a trace-route can be used to identify the IP addresses of the various servers and nodes used in the delivery of content. Those skilled in the art will recognize that through the use of a trace-route and geo-positioning services which keep databases of the location of IP address the geographic location of the user can be determined with greater certainty. This information can be used to supply location information to the gateway 104 even if the user is attempting to obfuscate their location through IP spoofing or other techniques. In some implementations, this location information can be used to deliver location based ads and/or services.

In some implementations, the gateway 104 includes a website that provides user interfaces for advertisers 116 and content providers 118. In such a configuration, the gateway 104 can function as a content aggregator and/or ad syndicate. Additionally, the gateway 104 can act as repository and/or manager of DRM for content providers 118. In some implementation, the advertisers 116 and content providers 118 can login to the gateway 104 and set-up an account. A subscription fee or other compensation can be paid by the advertisers 116 and/or content providers 118 for various services provided by, or through, the gateway 104.

In some implementations, the gateway 104 can be configured to receive content descriptions and content identifiers for content that is available for receiving ads. The gateway 104 can use the content descriptions to match content with the needs of advertisers and/or publishers who wish to include ads in the content. Content identifiers can be embedded in the content 126 at specific locations associated with the advertised product(s) or service(s). In the example shown, the reader 106 can extract a content identifier from the CI information 132 and sends the content identifier to the gateway 104. The gateway server 120 receives the content identifier and matches it with ad(s) associated with the content identifier. The ads are then downloaded by the server 120 to the host device 102 where they can be embedded in, or overlaid on, the content 126 by the content formatter 108 at specified locations. The ads can be presented on a frame, strip, side bar or other display area proximate to the content 126. The ads can also be presented during a pause in the consumption (e.g., viewing of a film) of the content 126. To thwart piracy, moving or static ads can be embedded in, or overlaid on, a strip or subsection of the content 126, so as to partially or fully obfuscate the content. The ads can invite the user to contact the gateway 104 or the content providers 118 directly to receive an authorized version of the content 126. Once authorized, the ads can be removed from the content 126 and replaced with the original content displaced by the ad.

In some implementations, the gateway 104 can send DRM commands and other DRM information to the host device 102, which can control the reconstruction of content. For example, a DRM command can be used by the content formatter 108 to disable or otherwise cause the content 126 to remain scrambled, encrypted, or to be displayed with low resolution, artifacts, warning messages, etc. DRM commands can also be used by the content player 110 to stop, pause or otherwise disrupt the playing of the content 126 on the host device 102.

In some implementations, content timing information and/or position information is provided to the gateway server 120 by the host device 102. The timing information enables the server 120 to present ads to the user of the host device 102 at the right moment as an icon, link or other user interface element, which can be activated by a user to display the ad. The server 120 can assign different ads to different parts of the content as agreed to by the advertisers 116 and content providers 118. The coordinates for ad space within a display screen can be provided by the content providers 118 and adjusted by the gateway 104 based on host device information. For example, the content providers 118 could provide information about ad space available with the content 126, such as the sequence of video frames that include the available ad space, where the ad space is located in the frames (e.g., video frame coordinates), the types of ads allowed in the ad space, whether the ads can be static, dynamic or interactive, the length of the video sequence for which the ad space will be presented, etc. Using information about the display screen 113 of the host device 102 (e.g., size, resolution, color palette), the gateway 104 can format the ads for display on the host device 102. Such information could be stored in a database at the gateway 104, and accessed using a host device identifier. Content owners may wish to leave blank certain sections of a video (e.g., a billboard appearing in a film) which can then be overwritten by an ad. This is already practiced in television by the use of a technique known as "blue screening."

In some implementations, the CI downloaded with or in the content can be detected and/or decoded by a Java® applet or servelet associated with the user's browser and which will act as a partial or full implementation of the multi-protocol reader. In this case all or some of the functions of the multi-protocol reader can be implemented without installing client software on the host device.

Content Interactivity System for Streamed Content

Figure 1B:
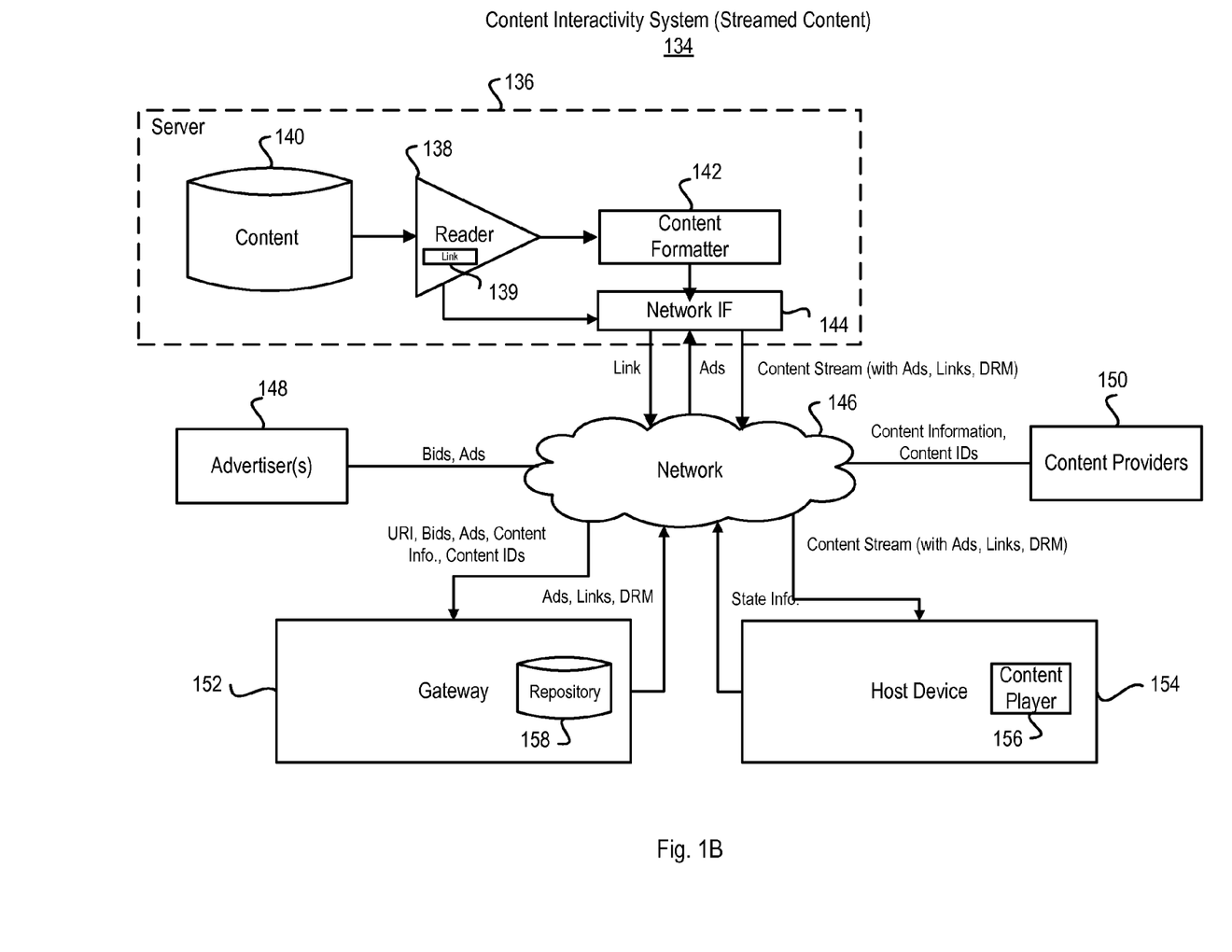
FIG. 1B is a block diagram of an exemplary content interactivity system for streamed content.

FIG. 1B is a block diagram of an exemplary content interactivity system 134 for streamed content. The system 134 includes a content server 136 coupled to a resource gateway 152 and a host device 154 through a network 146 (e.g., the Internet, wireless network). Other configurations are possible, including but not limited to multiple content servers, host devices and resource gateways.

In some implementations, the content server 136 includes various components (e.g., servers) for streaming content to multiple host devices 154, together with other information obtained from the gateway 152. The server 136 includes a multi-protocol reader 138, a content formatter 142, a network interface 144 and a content repository 140. The reader 138 reads content from the repository 140 or other content resource, and extracts CI information (e.g., content ID, timing information), which can be sent to the gateway 152 through the network interface 144. A communication channel or link can be established between the reader 138 and the gateway 152 using a link 139 (e.g., a URI) contained in the reader 138 or extracted from the content. If the content is protected (e.g., scrambled content), a watermark or other information contained in the content can be extracted and used by the content formatter 142 to re-construct the content before streaming the content to the host device 154.

In some implementations, the protected content is sent to the host device 154 and the host device 154 re-constructs the content. In other implementations, partially re-constructed content is sent to the host device 154, and the host device 154 completes the re-construction.

The host device 154 can include a content player 156 for playing content. Some examples of content players are Windows® Media Player developed by Microsoft® Corporation and QuickTime® developed by Apple Computer, Inc. The host device 154 can be any device capable of receiving content, including but not limited to: computers, web-enabled devices, mobile phones, media players, music players, game consoles, personal digital assistants (PDAs), televisions, etc. The host device 154 can also be devices tethered to devices coupled to the network 146 (e.g., removable storage devices). In some implementations, the host device 152 can log into a website or other interface associated with the server 136 and request the streaming of content (e.g., video, audio). The streamed content is received by the host device 154 through the network 146 using known streaming protocols (e.g., UDP, RSTP, HTTP). The content player 156 on the host device 154 presents the streamed content to the user of the host device 154.

The resource gateway 152 includes a repository 158 for storing ads, links and other information (collectively, referred to as "resources"). In addition to the repository 158, the gateway 152 can include various components (not shown) for communicating with the content streaming server 136, such as one or more server computers, etc. The reader 138 in the server 136 establishes communication with the gateway 152 and passes CI information to the gateway 152 that can be used to determine resources associated with the content. For example, a content ID and timing information can be sent to the gateway 152, where it can be used to select an ad that can be provided to the host device 154 with the streamed content.

Content Interactivity Process

Figure 2:
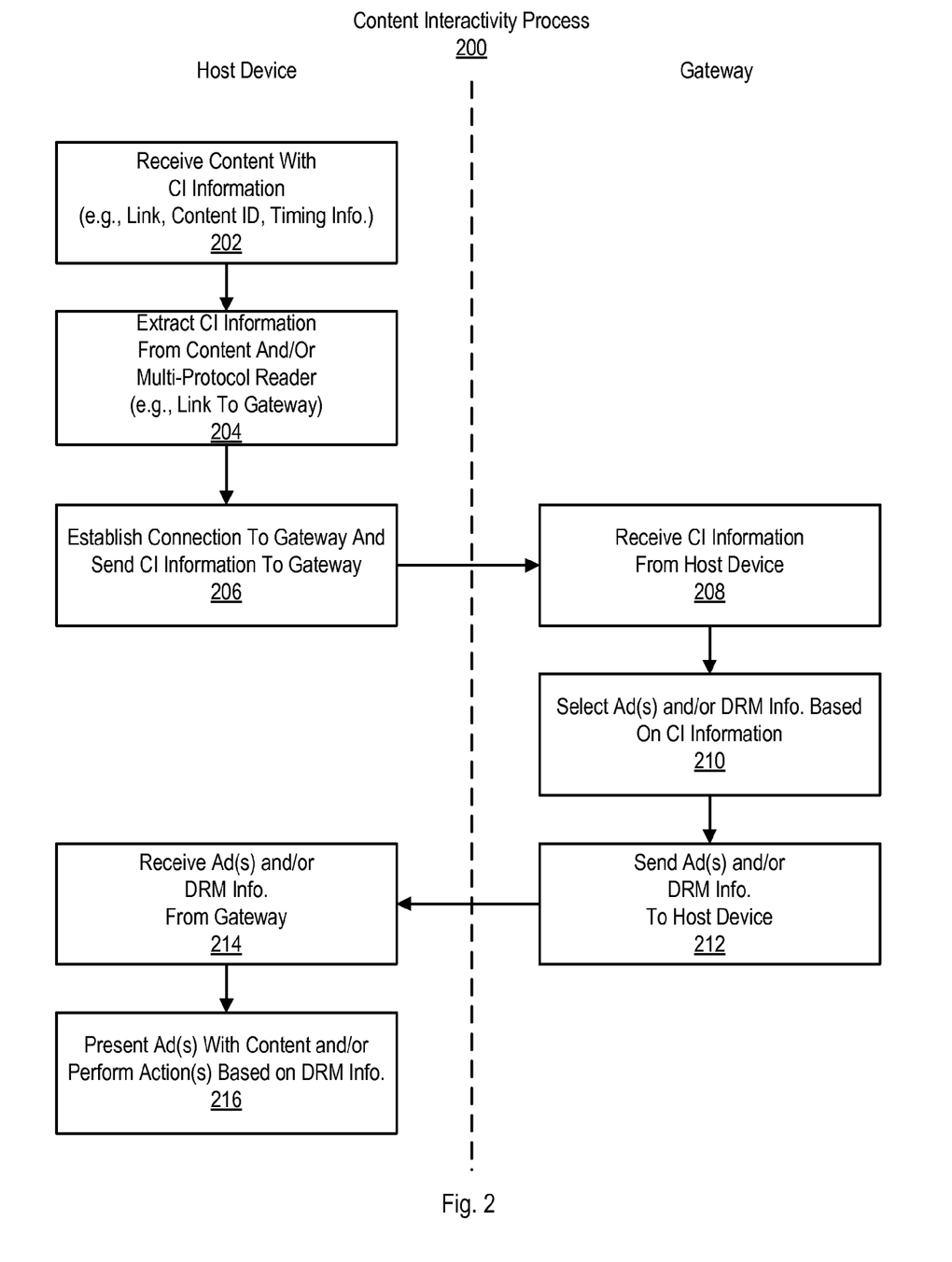
FIG. 2 is a flow diagram of an exemplary content interactivity process.

FIG. 2 is a flow diagram of an exemplary content interactivity process 200. The process 200 includes interactivity between a host device and a gateway over a network. Multiple instances of the process 200 can occur concurrently between a single host device and a single gateway, between multiple host devices and a single gateway, between a single device and multiple gateways or between multiple devices and multiple gateways. Gateways can be localized to a particular geographic region or location. Communications between host devices and gateways can occur over a variety of communication mediums (e.g., copper, optical fiber, radio frequency waves) using a variety of known communication protocols (e.g., TCP/IP, ISDN, POTS).

In some implementations, the process 200 begins when a host device receives content that includes CI information (202). There can be CI information for the entire content or separate CI information for different portions of the content. CI information can be inserted at specified locations in the content (e.g., specified frames) or provided at the beginning or end of a stream of content. The CI information can be multiplexed with the content at a different frame rate than the content. In some implementations, when the content is received at the host device, a multi-protocol reader reads or otherwise extracts the CI information from the content (204) using known techniques. In some implementations, at least some CI information is included in the multi-protocol reader, which can be distributed with content or otherwise installed on the host device using other means (e.g., pre-installed on the host device, downloaded from website, installed from storage media). The CI information included in the multi-protocol reader can be a link (e.g., a URI), which can be used to establish a connection to the gateway, for providing access to a variety of informational, advertising and transactional resources. In some implementations, the CI information can include a content identifier, host device identifier and/or user identifier for matching the content, host device or user with ads, DRM information or other information and services (e.g., online stores, social networks, chat rooms, advertiser websites, payment websites (e.g., PayPal®), etc.

The host device establishes a link with the gateway (e.g., using the link included in the multi-protocol reader) and sends all or some of the CI information to the gateway (206), where it is received by the gateway (208) and processed. In some implementations, the CI information can be used to select ad(s) and/or DRM information (210) at the gateway. Examples of DRM information include but are not limited to: commands, warning messages, instructions for acquiring a license or authorization, copyright information, etc.

The gateway sends the ad(s) and/or DRM information to the host device (212), which receives the ad(s) and/or DRM information (214). The host device presents the ad(s) and/or DRM information on a display screen and/or audio system of a host device (FIG. 1), or otherwise acts upon the information depending on the application (216) (e.g., execute DRM commands). For example, ads can be placed in ad space that is embedded in, overlaid on, or displayed proximate to content. If the gateway sends DRM information to the host device, which includes DRM commands, the DRM commands can be executed by a DRM client process in the host device (e.g., disabling reconstruction of the content, decrypting content). If the DRM information includes a warning message regarding pirating or instructions for obtaining a license, such messages can be displayed or otherwise presented on the host device while the content is playing.

Figure 6:
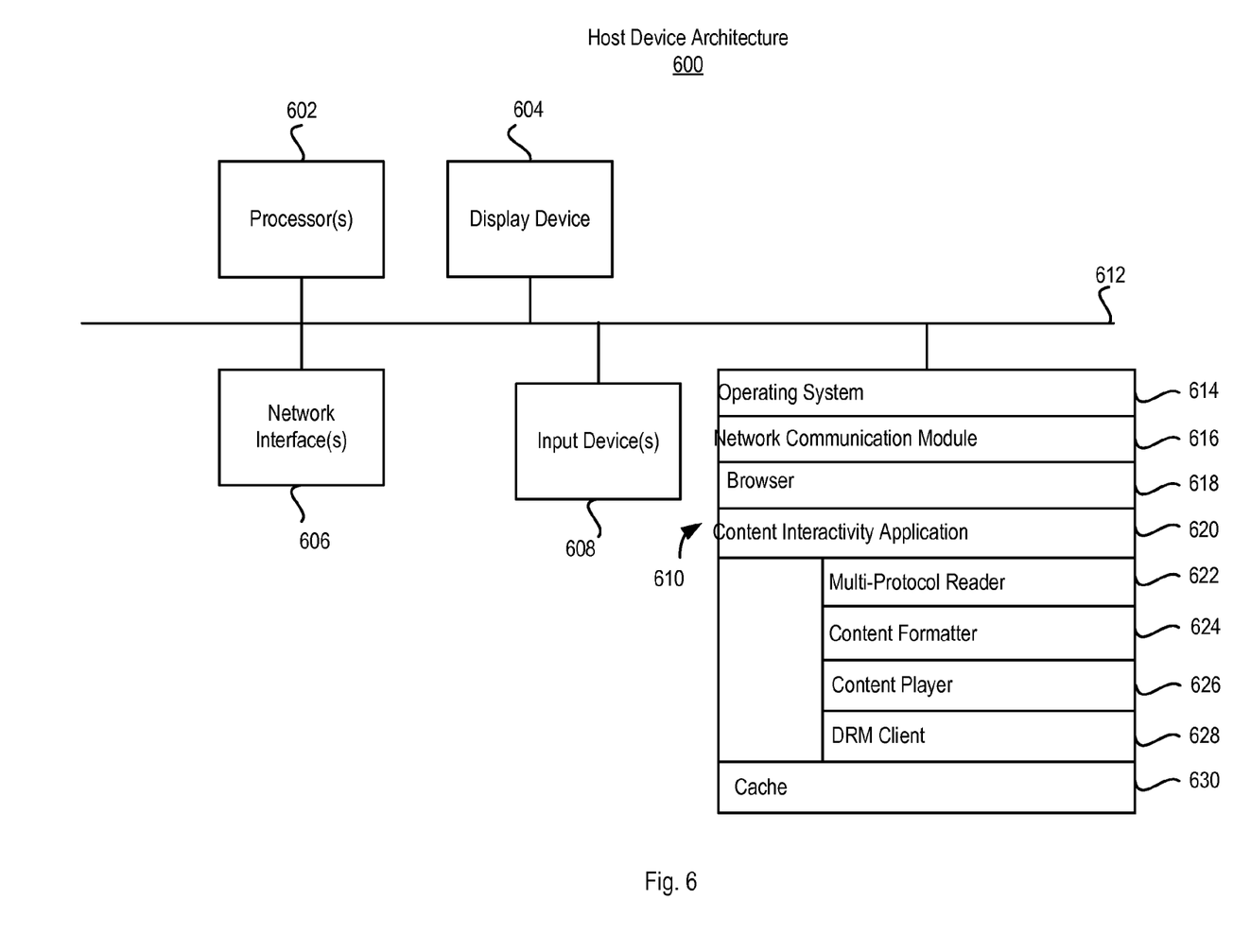
FIG. 6 is a block diagram of an exemplary host device architecture.

In some implementations, ads and/or other information can be stored in cache 630 of the host device (See FIG. 6). For example, the reader 106 can detect when the host device from disconnected to the network 114 and retrieve static ads, links and/or other information from the cache 630, rather than receiving such items directly from the gateway 104. When the host device 102 is reconnected to the network 104, the contents in the cache 630 can be updated by the gateway 104. The updating can be performed on a scheduled basis or in response to a trigger event.

In some implementations, the cache 630 can be continuously or periodically updated with ads and/or other information while the host device 102 is online. Such updating can be performed as a background process that is transparent to the user. To reduce latency, the reader 106 can be configured to hit the cache 630 for ads, links and/or other information, rather than receiving the ads, links and/or other information directly from the gateway 104.

Content Auction Process

FIG. 3 is a flow diagram of an exemplary content auction process 300. In some implementations, a gateway provides means for matching content available for advertising. To facilitate the process 300, the gateway can include a website that provides user interfaces for advertisers and content providers. Content providers can establish accounts with, or through, the gateway and submit content descriptions, content identifiers and other information for content they wish to make available to advertisers. Similarly, advertisers can establish accounts and submit ads, bids and other information for a content auction managed by the gateway. In some implementations, a user interface can be provided for third parties who append additional content descriptors or watermarks to content owned or controlled by others (e.g., authorized distributors).

The process 300 begins when the gateway receives content descriptions and content identifiers for the content to be made available to advertisers (302). The gateway publishes or otherwise makes available a process for advertisers to select or bid on the available content (304). The publication can occur through a website, broadcasts, emails or any other communication medium. The gateway receives requests or bids from advertisers for available content (306). The gateway receives ads for placement with content (308).

In some implementations, the advertisers can specify how and where the ads will be placed in the content. Content can be pre-screened and as a result, sections of it can be pre-identified with keywords, such as "car", "boat" etc., or with the brand names of products appearing in the content. Advertisers can pick which sections of content are the most relevant to their products, similarly to the way online advertising can be associated with keywords. The advertisers may also provide the gateway with different types of ads for placement in content (e.g., banners, buttons). The gateway associates the ads with content identifiers and stores the ads and content identifiers in a repository (310). For example, the ads and content identifiers can be stored in a database (e.g., MYSQL®), directory (e.g., LDAP directory), file system, table or any other suitable data structure, which can be indexed or otherwise accessed by the gateway.

In some implementations, content can be divided into time sectors, of equal or different lengths. Each time sector can be assigned to one or more key words, brand names and/or other information. Ads can be assigned to the keywords, brand names and/or other information and priced based on a variety of factors. Pricing factors include but are not limited to: 1) the desirability of the content (e.g., name recognition, date of release), 2) the length of the time sector during which a keyword persists, 3) availability of an ad for off-line interaction (e.g., a cached ad), and 4) geographic location for which the ad is targeted. Other pricing factors are also possible.

User Interface Elements

Figure 4:
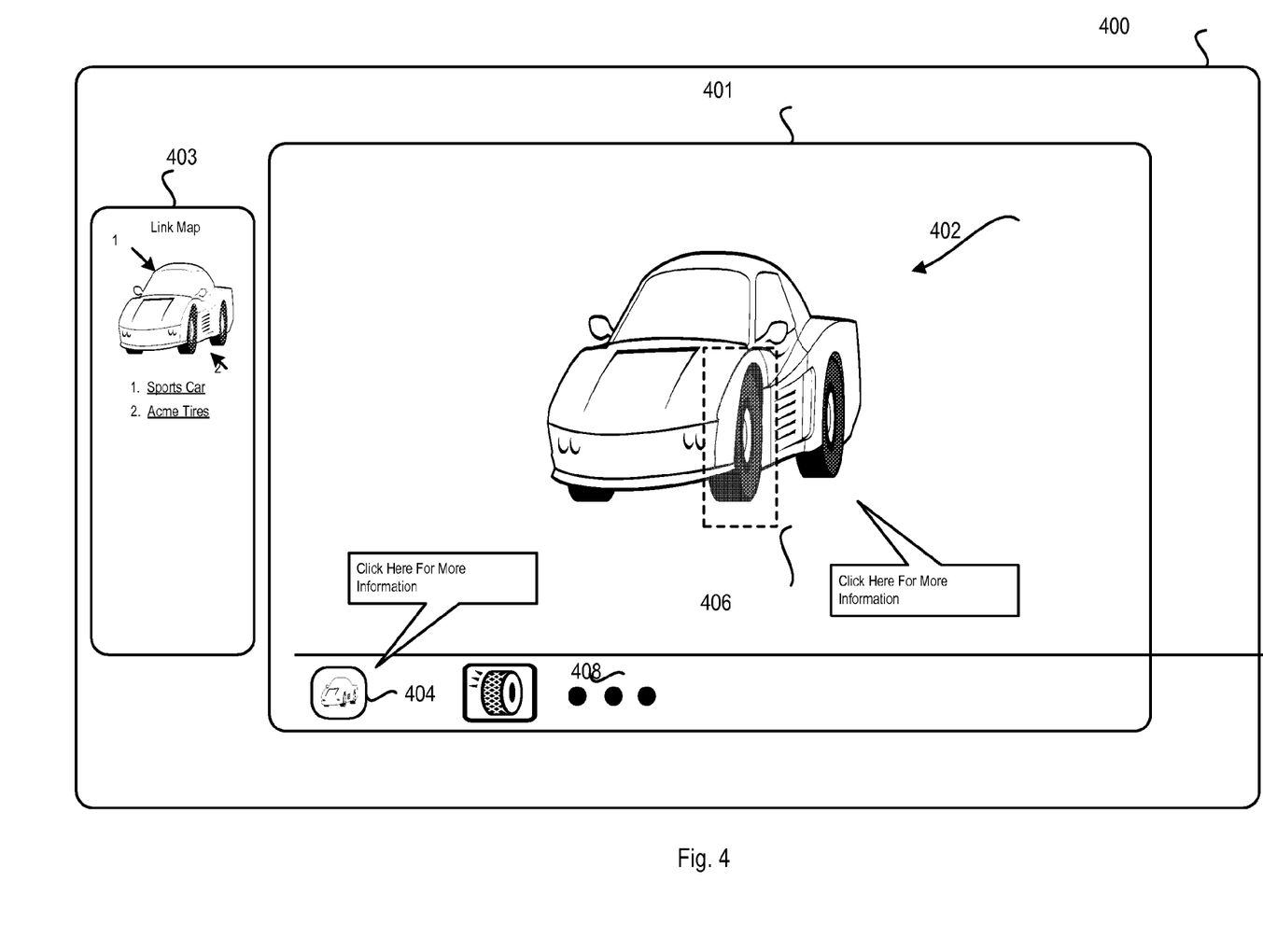
FIG. 4 is a screenshot illustrating exemplary user interface elements for connecting to a gateway.

FIG. 4 is a screenshot illustrating exemplary user interface elements for connecting to a gateway. In the example shown, a user interface 400 includes a display 401 (e.g., a browser window, media player display) for presenting content 402 (e.g., a video) and an optional side bar 403 for displaying information related to the content (e.g., ads, links). User interface elements 404 and 406 provided by a gateway have been added to the display 401. In this example, the content 402 is an automobile (and its tires), the user interface elements 404, 408, are icons and the user interface element 406 is a box. Other user interface elements are possible, such as links represented as icons at the top, bottom or sides of the display screen, as outlines or boxes around video objects, which are associated with informational, advertising and merchandising resources, or icons appearing at the end of the content. Video objects can be associated with multiple user interface elements. For example, the tires are associated with the bounding box 406 and the icon 408.

While the content 402 is playing on a host device, one or more watermarks are read and one or more content identifiers associated with the car and its tires are sent to a gateway. Ads for the automobile and its tires are matched with the content identifiers and sent to the host device where the ads, or links to the ads, are displayed as shown in FIG. 4. In some implementations, links to the ads are displayed in the content 402 when the playing of the content is paused. Alternatively, the ads or links can be displayed in the sidebar 403, or other display in the user interface 401, while the content is playing. In the example shown, the side bar 403 presents a thumbnail image of products shown in the content 402 (e.g., a car and tires) and the links for the products.

In some implementations, a timer can be started at the host device for which an ad should be presented to the user. If a threshold time is exceeded, then the placement of the ad can be skipped. If the content is video, the placement of the ads can be across a predetermined number of video frames, or for a predetermined period of time (e.g., the length of a movie scene). Audio can be provided with the ads (e.g., streamed or downloaded with the ads), which describes the ad targeted content or provides other information related to the targeted content (e.g., instructions for using the icon 404 or box 406). In some implementations, multiple objects in a frame, frame sequence, scene or other portion of content can be separately targeted with ads. In the example shown, the automobile and the tires are separately targeted with the icon 404 and the box 406, respectively. The user can interact with the icon 404 by clicking on it with a pointing device or mousing over the icon 404. When the user interacts with the icon 404 or the box 406 a bubble or other display can be presented, providing instructions or other information related to the targeted video object.

In some implementations, all or some of the links associated with content can be aggregated and presented in a list or other display at the end of the content playback. For example, when the content playback is stopped (e.g., by the user or automatically when the content is exhausted), then some or all of the links or ads associated with the content can be presented to the user in a list or other display. Such links can remain active in the side bar 403 for a predetermined period of time after the content is terminated (e.g., an hour), and/or can remain active until the occurrence of a predetermined trigger event (e.g., playback of different content, content player is closed, host device is powered-off).

In some implementations, trailers in the beginning of video content can be completely replaced, so that each time the content is viewed, up-to-date trailers are presented to the user (e.g., movies that have not yet been released). Since trailer are typically part of the content, the content formatter 108 and/or reader 106 can include a rendering engine for rendering ads, links and other information that can be used to replace content. In some implementations, a separate rendering engine can be used to render ads, links and/or other information.

GATEWAY ARCHITECTURE EXAMPLE

Figure 5:
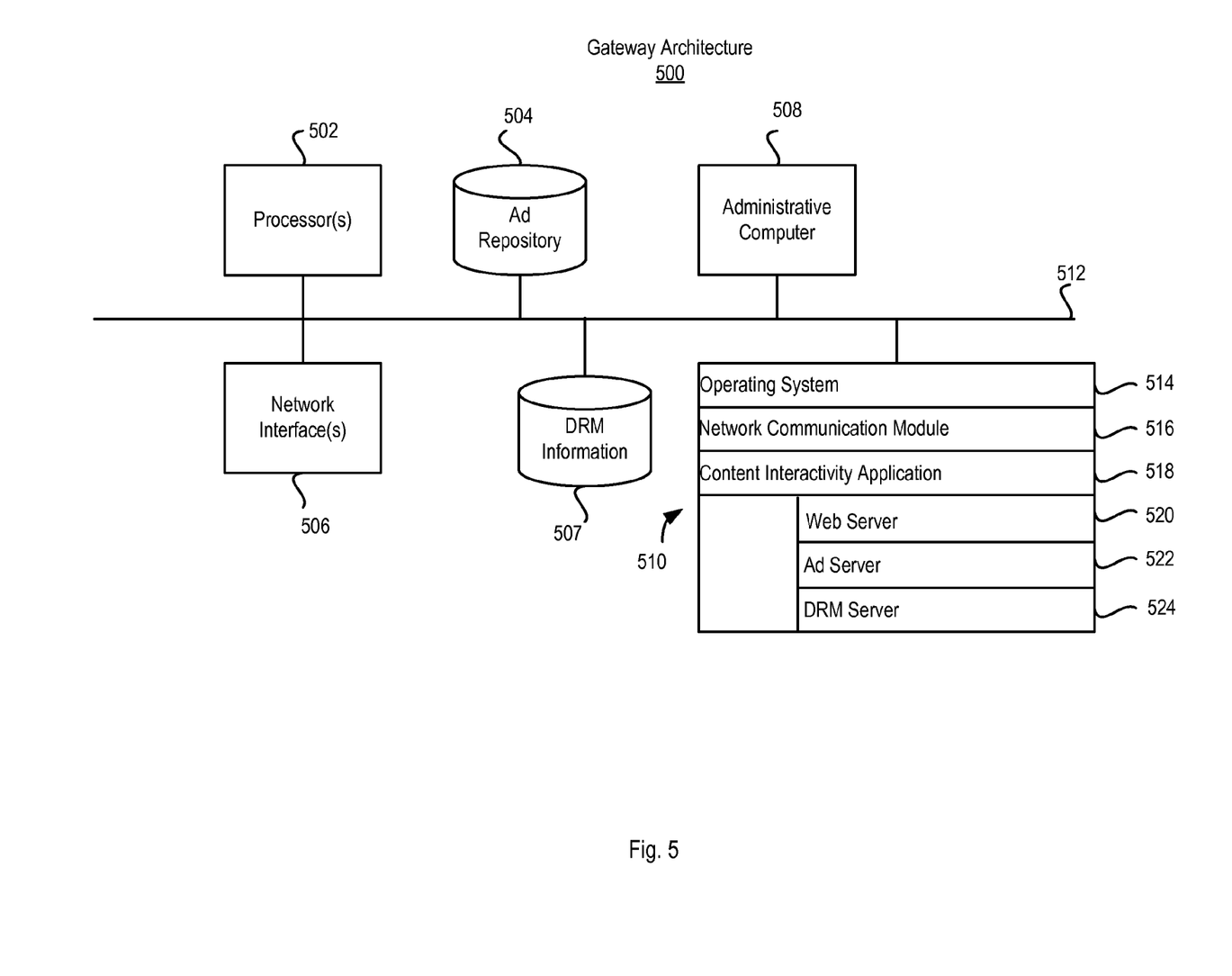
FIG. 5 is a block diagram of an exemplary gateway architecture.

FIG. 5 is a block diagram of an exemplary gateway architecture 500. Other architectures are possible, including architectures with more or fewer components. In some implementations, the architecture 500 includes one or more processors 502 (e.g., dual-core Intel® Xeon® Processors), an ad repository 504, one or more network interfaces 506, a DRM repository 507, an optional administrative computer 508 and one or more computer-readable mediums 510 (e.g., RAM, ROM, SDRAM, hard disk, optical disk, flash memory, SAN, etc.). These components can exchange communications and data over one or more communication channels 512 (e.g., Ethernet, Enterprise Service Bus, PCI, PCI-Express, etc.), which can include various known network devices (e.g., routers, hubs, gateways, buses) and utilize software (e.g., middleware) for facilitating the transfer of data and control signals between devices.

The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 510 further includes an operating system 514 (e.g., Mac OS® server, Windows® NT server), a network communication module 516 and a content interactivity application 518. The operating system 514 can be multi-user, multiprocessing, multitasking, multithreading, real time, etc. The operating system 514 performs basic tasks, including but not limited to: recognizing input from and providing output to the administrator computer 508; keeping track and managing files and directories on computer-readable mediums 510 (e.g., memory or a storage device); controlling peripheral devices (e.g., repositories 504, 507); and managing traffic on the one or more communication channels 512. The network communications module 516 includes various components for establishing and maintaining network connections (e.g., software for implementing communication protocols, such as TCP/IP, HTTP, etc.).

The content interactivity application 518 includes a web server 520, an ad server 522 and a DRM server 524. These servers can be server processes running a single server (e.g., server 120) or run on separate servers or server processes co-located in the same facility or distributed over a network. The web server 520 can provide user interfaces in the form of web pages for advertisers and content providers to interact with the gateway, and can also serve web pages to host devices in response to user interaction with user interface elements. The ad server 522 manages processes related to ads and the transmission of ads to host devices. For example, the ad server 522 can host processes for matching content identifiers with ads, as described in reference to FIGS. 1-4. The DRM server 524 manages DRM processes, as described in reference to FIGS. 1-4.

The architecture 500 is one example of a suitable architecture for hosting an ad targeting application. Other architectures are possible, which include more or fewer components. For example, the ad repository 504 and GI repository 507 can be the same storage device or separate storage devices. The components of architecture 500 can be located in the same facility or distributed among several facilities. The architecture 500 can be implemented in a parallel processing or peer-to-peer infrastructure or on a single device with one or more processors. The content interactivity application 518 can include multiple software components or it can be a single body of code. Some or all of the functionality of the content interactivity application 518 can be provided as a service to content providers, advertisers and end users over a network. In such a case, these entities may need to install client applications. Some or all of the functionality of the ad targeting application 518 can be provided as part of a search engine and can use information gathered by the search engine to target ads, as described in reference to FIGS. 1-4.

HOST DEVICE ARCHITECTURE EXAMPLE

FIG. 6 is a block diagram of an exemplary host device architecture 600. Other architectures are possible, including architectures with more or fewer components. In some implementations, the host device architecture 600 includes one or more processors 602 (e.g., dual-core Intel® Xeon® Processors), a display device 604 (e.g., an LCD), a network interface 606 (e.g., a Ethernet, USB, Firewire®), one or more input devices 608 (e.g., mouse, keyboard) and one or more computer-readable mediums 610 (e.g., RAM, ROM, SDRAM, hard disk, optical disk, flash memory, SAN, etc.).

The components of the host device architecture 600 described above can exchange communications and data over one or more buses 612 (e.g., EISA/ISA, PCI, PCI-Express) for facilitating the transfer of data and control signals between the component of the architecture 600.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 610 further includes an operating system 614 (e.g., Mac OS® , Windows® XP, Linux® OS), a network communication module 616, a browser 618, and a client content interactivity application 620.

The operating system 614 can be multi-user, multiprocessing, multitasking, multithreading, real time, etc. The operating system 614 performs basic tasks, including but not limited to: recognizing input from the input devices 608 and providing output to the display device 604; keeping track and managing files and directories on computer-readable mediums 610 (e.g., memory or a storage device); controlling peripheral devices (e.g., printers, external storage devices); and managing traffic on the one or more buses 612. The network communications module 616 includes various components for establishing and maintaining network connections and services (e.g., software for implementing communication protocols and services, such as TCP/IP, HTTP, sync services, etc.).

The client content interactivity application 620 includes various software components (e.g., written in Java®, Objective-C or other known computer languages) for performing the client interactivity processes on a host device, as described in reference to FIGS. 1-4. These components include a watermark reader 622 for reading watermarks, a content formatter 624 for re-constructing content, a content player 626 for playing content and a DRM client for performing client-side DRM commands and tasks. The content interactivity application 620 can include multiple software components or it can be a single body of code.

Content Interactivity Gateway For Peer-to-Peer Networks

Figure 7:
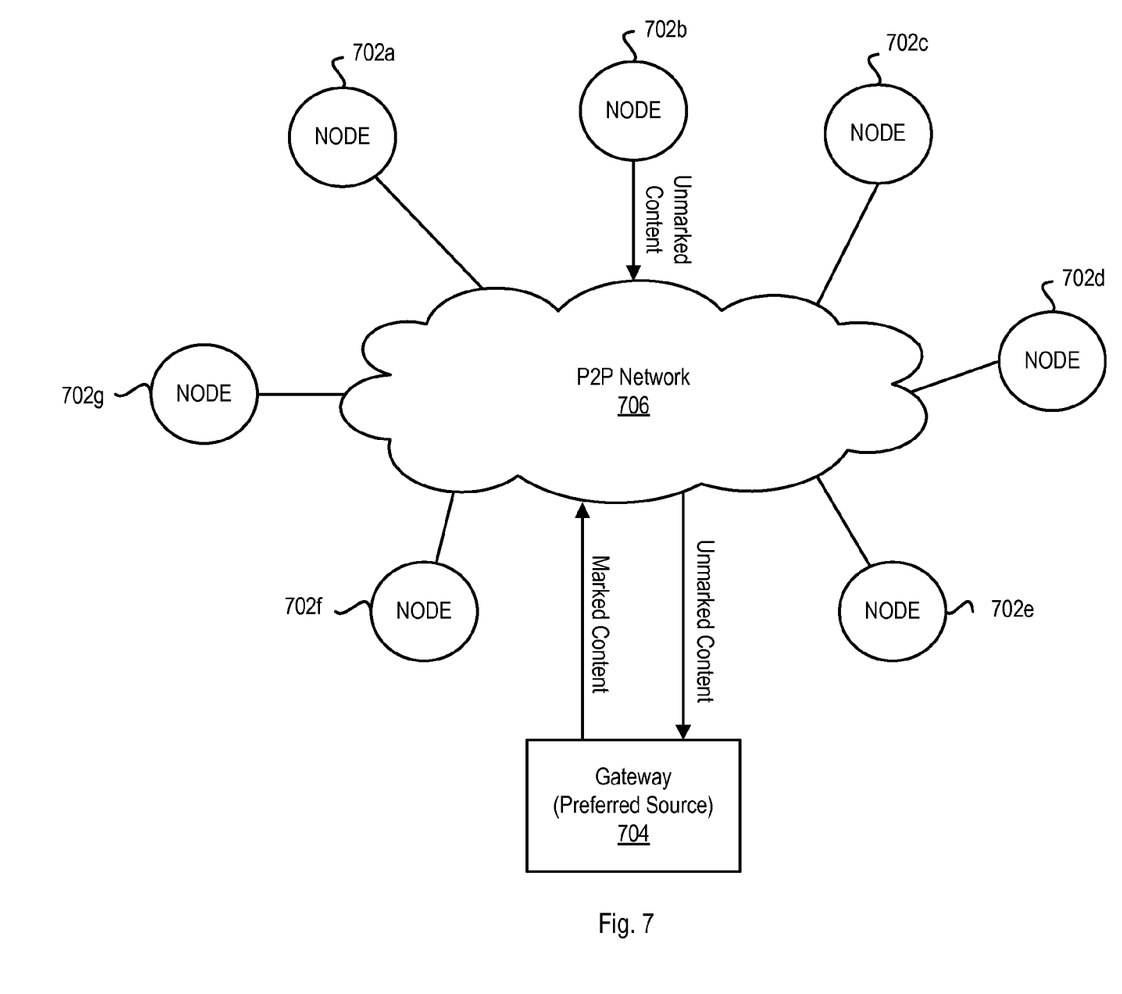
FIG. 7 is a block diagram of an exemplary peer-to-peer network including a resource gateway.

In some implementations, the host device 102 could be a node in a computer system (e.g., a personal computer) that is part of a P2P network 706, as shown in FIG. 7. In the P2P network 706, various peer nodes 702a through 702g can be seeded with high-quality content, which can be watermarked or tagged with identifiers. The unmarked content can be retrieved from the peer nodes 702a through 702g and sent to a gateway 704. At the gateway 704, CI information can be added to the unmarked content (e.g., content that is most often pirated) and re-introduced into the P2P network 706, so that the content including the CI information can be copied by other peer nodes 702 in the P2P network 706. For example, a watermark including CI information can be inserted in unmarked content (e.g., a video) retrieved from peer node 702b, then re-introduced back into the same peer node or other peer node 702 in the P2P network 706.

In some implementations, unmarked content is not extracted from peer nodes 702 in the P2P network 706. Rather, the gateway 704 acts as a "honey pot" of marked content, which is retrieved by the peer nodes 702. In such an implementation, users will be attracted to the "honey pot" of content, which includes highly desirable content (e.g., new film releases), and will download the marked content to their devices.

In some implementations, the gateway 704 can become a preferred source for watermarked content in the P2P network 706 through the use of pollution and poisoning attacks. For example, the gateway 704, acting as a peer node, can insert fully useable, but watermarked or tagged, files in the P2P network 706. If the watermarked/tagged content is fully useable and/or of high quality, then the peer ranking for the gateway 704 will increase as the gateway 704 gives more than takes from the P2P network 706, especially if the peer nodes 702 in the P2P network 706 provide poor quality and/or partially useable content. Content availability, pollution and poisoning in a P2P network is described in Christin, N., et al., "Content Availability, Pollution and Poisoning In File Sharing Peer-to-Peer Networks," Proceedings of ACM EC '05, Vancouver, British Columbia, Canada, June 2005, which article is incorporated by reference herein in its entirety.

In some scenarios, a content identifier may not be available for some content to be seeded. In those cases, the content needs to be identified before it can be watermarked or tagged with identifiers. The identification can be done in several ways. In such cases, the unknown content can be correlated to a known content database by comparing the content bit streams. This comparison can be performed on raw data using a sliding window correlation or by comparing hashes, fingerprints or similar content identifiers, which can also use a sliding window. The hashes, fingerprints or similar content identifiers can be custom designed for this purpose based on known hashing technology (e.g., MD5, SHA).

In other implementations, image and/or audio analysis can be performed on the first few frames of a video, image and/or audio content, where the title can be read and/or the opening music theme can be retrieved and compared against a known content database.

This functionality can be included in the reader and run as a transparent background process while content is being downloaded, buffered for streaming or any other suitable time (e.g., during trailers or when copyright information is displayed). This scheme would allow CI information to be created for content that is not in any database (e.g., an independent film). For example, the title page of a film could be read and the title and studio information inserted in the content as part of a watermark payload. Hashes or video, image/audio similarity measures can be sent to the gateway by the reader for a comparison against content databases. For example, the content player could generate its own CI information and add in a watermark without any pre-existing CI information. Such a feature could be useful to Internet Service Providers (ISPs), network companies and the like, as a way to monitor and sanitize pirated content.

In some scenarios, a CI audio watermark created using the scheme described immediately above could be removed from the content if a copy of the unmarked content is available. For example, the unmarked content could be subtracted from the marked content and the leftover content would be the watermark. The watermark/tag could then be subtracted from marked content. This scenario could be thwarted, however, by randomly offsetting temporally the watermark each time the same content is marked. This way the watermark will be different even if it contains the same CI information and is provided in the same content.

Once the P2P network is benignly polluted with watermarked, high quality copies of content (e.g., film), P2P users can be offered a high quality media player with a reader that can pick out watermarked/tagged copies of the content from the other pollution and/or decoys injected into the system. Prior to download or streaming, the reader can sample watermarks/tags randomly throughout the content to ensure that the watermarked content was not attacked or otherwise tampered with. The watermarked/tagged content can also be sampled and compared to good copies in other ways besides checking watermarks (e.g., hash correlation). This would ensure that only good content copies are accepted by the peer node that has the reader installed.

Some advantages of the foregoing implementation are: 1) content pirates have an incentive to install a reader on their peer node because it provides a sanitized copy of content, and 2) the P2P network will eventually be cleared of pirated content, while generating ad fees for content aggregators and preventing the non-monetized dissemination of content.

Various modifications may be made to the disclosed implementations and still be within the scope of the following claims.

What is claimed is:

1. A system for providing interactive content, comprising:
    a resource gateway computer for providing resources;
    a host device computer for processing content, wherein the host device computer comprises, a reader, the reader being programmed to receive content from a distribution channel, to extract first information corresponding to the received content, and to associate the received content with the resources; and
    a network interface programmed to operatively couple the reader to the resource gateway computer utilizing at least a portion of the first information to select, for display on a display device coupled to the host device, interactive content corresponding to the received content and the resources provided by the resource gateway computer.

2. The system of claim 1, where the first information includes information selected from the group consisting of: a content identifier, a uniform resource identifier, a device identifier, a user identifier, standardized content descriptors, XML descriptors, and timing information.

3. The system of claim 2, wherein the first information comprises a content identifier, and wherein the network interface is programmed to send the content identifier to the resource gateway and to receive the resources associated with the content identifier from the resource gateway.

4. The system of claim 3, wherein the resources are selected from the group consisting of: advertising resources, merchandising resources, and digital rights management (DRM) resources.

5. The system of claim 1, wherein the resource gateway is further programmed to independently associate the content with the resources.

6. The system of claim 1, further comprising:
    a content formatter operatively coupled with the reader, wherein the content formatter is programmed to reformat the content.

7. The system of claim 6, further comprising: a content player operatively coupled with the content formatter and the network interface, the content player programmed to play the content reformatted by the content formatter and to play the resources to provide the interactive content.

8. The system of claim 1, wherein the reader is selected from the group consisting of: a multi-protocol reader and a watermark reader.

9. The system of claim 1, wherein the content is selected from the group consisting of:
    video, audio, text information, graphics, ads, digital photos, digital rights information, music, movies, software, multimedia, documents, television broadcasts, radio broadcasts, web casts, and web pages.

10. The system of claim 1, wherein the first information is inserted into the header of a data packet.

11. The system of claim 1, wherein when the first information is not available, the content is identified using hashing and fingerprinting such that the content is matched with the resources to provide the interactive content.

12. The system of claim 1, wherein the content is streaming.

13. The system of claim 1, wherein the resource gateway further comprises:
    an ad syndicate programmed for receiving bids on the resources associated with the content from a plurality of advertisers.

* * * * *